April 5, 1966
G. SPIESS ETAL
3,244,957
STARTING ARRANGEMENTS OF ELECTRIC DRIVES
WITH MECHANICAL HOLDING BRAKES
Filed Aug 31, 1960
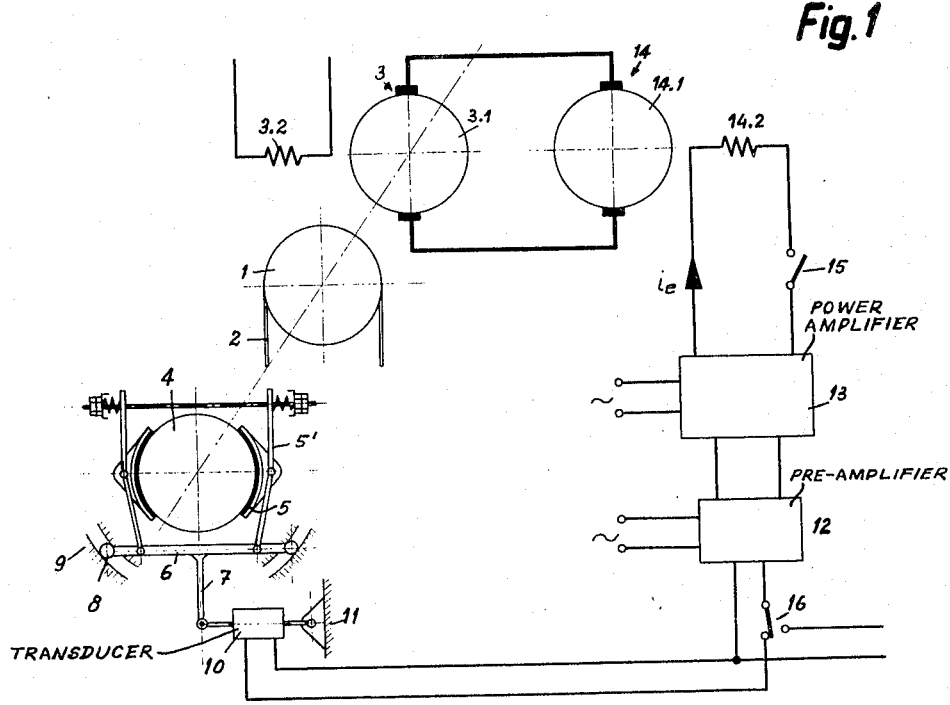
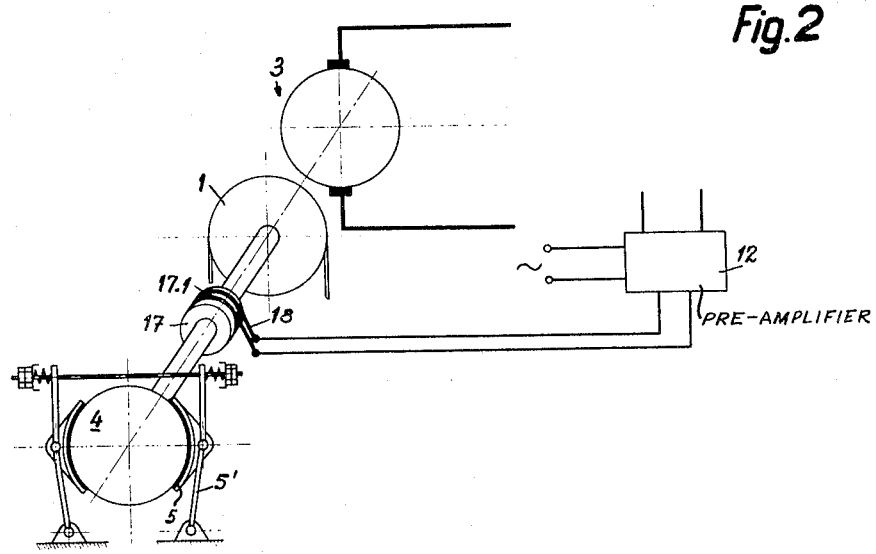
Inventors
Gustav Spiess & Anton
Rufli
By Richard Lord agt United States Patent Office 3,244,957
Patented Apr. 5, 1966

3,244,957
STARTING ARRANGEMENTS OF ELECTRIC DRIVES WITH MECHANICAL HOLDING BRAKES
Gustav Spiess, Geissmattstr. 21, and Anton Rufli, Wesemlinstr. 69, both of Lucerne, Switzerland
Filed Aug. 31, 1960, Ser. No. 53,123
Claims priority, application Switzerland, Sept. 2, 1959, 77,789
11 Claims. (Cl. 318—431)

The invention relates to starting arrangements of electric drives with mechanical holding brakes.

In connection with an electric drive, especially an electric drive for vehicles and lifting arrangements, often a load exerts a torque on a driving motor even when at rest which torque is counteracted by a mechanical holding brake. When, on starting, the mechanical brake is released, the load is liable to move somewhat forwards or backwards depending on the load and the direction of movement, until the correct torque of the driving motor has been reached. When a drive is manually operated such movement of the load can be avoided by suitably manipulating the brake and a starting control. When, however, a drive operates automatically a shock may be experienced on automatic starting.

It is an object of the invention to provide an automatic starting arrangement of an electric drive with a mechanical holding brake wherein such a shock on starting is avoided or at least reduced.

The invention consists in a starting arrangement of an electric drive with a mechanical holding brake wherein means are provided for counteracting the torque exerted by a load on the brake by an initial torque exerted by a driving motor prior to the release of the brake. Preferably, means are provided for adjusting the initial torque exerted by the motor so as to correspond to the torque exerted by the load. The arrangement may comprise means for measuring the amount and sense of the torque exerted by the load prior to starting and for converting the measurement into an electric analogue, means for causing said electric analogue to act on a supply source of the driving motor so that said motor creates the initial torque, and means for subsequently releasing the brake and initiating starting. By "electric analogue" is to be understood an electric voltage, current or the like.

Advantageously, means are provided for measuring the torque exerted by the load, said measuring means being in operative connection with the holding brake and with an electric amplifier, said measuring means converting the measured torque into an electric analogue which is amplified by said amplifier, the amplified analogue being fed to means for controlling a supply source of the driving motor. The driving motor may be a lifting motor of a lifting arrangement. The amplifier may comprise a pre-amplifier and a power amplifier, said power amplifier feeding current to a field winding of an electric generator a rotor of which is connected to a rotor of the driving motor.

The brake may comprise brake shoes mounted rotatably about the centre of a brake disc. The brake shoes may be carried by brake levers mounted on a beam having a roller at each end, each roller engaging a groove of a support.

Alternatively, the measuring and converting means may be provided on a shaft of a brake disc. The measuring and converting means may comprise slip rings co-operating with electric brushes for deriving the electric analogue from the measuring and converting means and feeding it to the amplifier.

To make the invention clearly understood reference will now be made to the accompanying somewhat diagrammatic drawings, which are given by way of example and in which:

FIG. 1 illustrates an embodiment of the invention; and
FIG. 2 illustrates a modified embodiment.

The embodiment of FIG. 1 comprises a driven pulley 1 operating a belt, rope or the like 2 one end of which carries a cabin of an elevator and the other end of which carries a counter-weight (the elevator and counter-weight not being shown). The pulley is driven by a separately excited direct current motor 3 coupled to the shaft of the pulley 1 and having a rotor 3.1 and a constantly excited field winding 3.2. A brake disc 4 is keyed to the pulley shaft and co-operates with brake shoes 5 mounted on respective levers 5'. During travelling of the elevator the brake shoes are released by movement of the levers 5' in a known manner. The levers 5' of the brake shoes 5 are mounted on a carrier beam 6 carrying an arm 7. At each end, the beam 6 is provided with a roller 8 guided in grooves of a support 9 forming circular arcs centered on the shaft of the brake disc 4 so that the brake shoes 5 are rotatable about the centre of the brake disc 4.

A power-measuring device 10 measures the torque exerted by a load on the brake shoes 5 when the arrangement is at rest, the measuring device 10 being rotatably mounted at 11 and connected to the arm 7. In this way the measuring device 10 can respond to tension or pressure depending on the sense of the torque on the brake disc 4. The device 10 may be a transducer in which the force corresponding to the torque causes a deformation of a measuring body, the deformation causing in turn a variation of a resistor, capacitor or inductor whereby an electric quantity is altered, so that its intensity corresponds to the torque. However any other suitable known device may be employed as the measuring device 10 provided that the torque is indicated electrically with respect to its amount and sense. By means of a known bridge circuit the measured torque is represented as a voltage or current signal which is fed to a pre-amplifier 12 in which the signal is amplified. The output of the pre-amplifier 12 is fed to a power amplifier 13, the output of the power amplifier 13 being fed across a switch 15 to a field winding 14.2 of an electric generator 14 a rotor 14.1 of which is connected to the rotor 3.1 of the driving motor 3 to form a Ward-Leonard circuit. Between the device 10 and the pre-amplifier 12 a switch 16 is provided, by means of which, after starting of the arrangement, an electric quantity corresponding to a difference between a desired speed and an actual speed of the elevator during its travel is fed to the pre-amplifier 12 for controlling the speed of the elevator.

The arrangement described operates as follows:
Let it be assumed that the load of the elevator cabin causes a torque in clockwise direction on the brake disc 4 and brake shoes 5. When the arrangement is to be started the field winding 3.2 of the direct current motor 3 is excited and the switch 15 is closed, the switch 16 being in the position illustrated. The electric signal given by the power-measuring device 10 is amplified by the pre-amplifier 12 and the power amplifier 13, and the amplified signal excites the field winding 14.2 of the generator 14 in such a sense that in the circuit of the rotors 14.1 and 3.1 a Leonard current flows in such a sense that the motor 3 develops a torque in anti-clockwise direction. Thereby the brake shoes 5 are relieved of the torque of the load. The entire arrangement forms a closed control circuit. On the brake shoes 5 only a negligibly small moment—the static control deviation—remains which is required for maintaining the current in the rotor circuit. Thus, the motor 3 has now taken over the torque from the brake so that when subsequently the brake is released no shock occurs. After the brake has been released the measuring device 10 is separated from the initial amplifier 12 by operating the switch 16. During travelling the pre-amplifier 12 and the power amplifier 13 are advantageously employed for controlling the speed of travelling. For this purpose a signal corresponding to the difference between a desired and an actual value of the speed is fed to the input of the pre-amplifier 12 through the switch 16.

In the embodiment of FIG. 2, a transmission type dynamometer 17 of known construction is employed which is carried on the shaft between the pulley 1 and the brake disc 4. A signal corresponding to the amount and sense of the torque is fed to the pre-amplifier 12 by means of slip-rings 17.1 and electric brushes 18.

Otherwise the embodiment is analogous to, and operates in an analogous manner as, the embodiment of FIG. 1.

Modifications of the embodiments described are possible. For example, instead of continuously operating power or torque measuring devices, alternatively devices having contacts, that is to say discontinuously operating devices may be used.

Instead of continuously operating amplifiers resistors may be provided in the motor circuit which are partly short circuited in steps. Such an embodiment may be employed in connection with a traction vehicle fed from a supply source of constant voltage.

What we claim is:
1. In an apparatus of the type described, in combination,
    (a) a rotatable shaft;
    (b) means for transmitting the torque of a load to said shaft;
    (c) brake means connected to said shaft for holding said shaft stationary against the torque of said load;
    (d) measuring means for measuring the torque of said load while said shaft is being held stationary by said brake means;
    (e) signal generating means connected to said measuring means for generating an electrical signal responsive to the magnitude of the torque measured;
    (f) electric drive means connected to said signal generating means for applying a torque to said shaft responsive to said signal, the torque of said drive means being opposed and substantially equal to the torque of said load.

2. In an apparatus as set forth in claim 1, said measuring means including means for measuring the torque transmitted by said shaft between said drive means and said brake means.

3. In an apparatus as set forth in claim 1, said drive means including an electric motor coupled to said shaft, and generator means supplying current to said motor, said generator means being connected to said signal generating means for varying said current responsive to the magnitude of said signal.

4. In an apparatus as set forth in claim 1, said torque transmitting means including pulley means on said shaft, and rope means trained over said pulley means for carrying said load.

5. In an apparatus as set forth in claim 1, said drive means including an electric motor coupled to said shaft, and generator means supplying driving current to said motor, said generator means having a field winding connected to said signal generating means for varying the current supplied responsive to said signal.

6. In an apparatus as set forth in claim 1, said brake means including a brake disc coaxially mounted on said shaft, a carrier means rotatable about the common axis of said disc and of said shaft, a lever pivoted to said carrier means, and a brake shoe normally engaging said brake disc and mounted on said lever.

7. In an apparatus as set forth in claim 1, said measuring means including transducer means for converting changes in the magnitude of said torque into changes in the magnitude of an electrical analogue.

8. In an apparatus as set forth in claim 7, said signal generating means including amplifier means responsive to changes in the magnitude of said electrical analogue to generate said signal.

9. In an apparatus as set forth in claim 1, said brake means including means for selectively releasing said shaft.

10. In an apparatus as set forth in claim 9, means for disconnecting said measuring means from said signal generating means when said shaft is released by said brake means.

11. In an apparatus as set forth in claim 9, means for disconnecting said electric drive means from said signal generating means when said shaft is released by said brake means.

References Cited by the Examiner

UNITED STATES PATENTS

| 469,361 | 2/1892 | Watson | 318—349 |
| 2,666,177 | 1/1954 | Brannin et al. | 73—136 |
| 2,809,309 | 10/1957 | Evans | 318—172 |
| 2,846,026 | 8/1958 | Gott et al. | 187—29 |

ORIS L. RADER, *Primary Examiner.*

S. GORDON, JOHN F. COUCH, *Assistant Examiners.*